W. H. STRICKLAND.
SAW SET.
APPLICATION FILED JUNE 21, 1917.

1,265,277.

Patented May 7, 1918.

WITNESSES
John P. Woodworth
L. B. Middleton

INVENTOR
William H. Strickland.
BY Richard Owen,
ATTORNEY

UNITED STATES PATENT OFFICE.

WILLIAM H. STRICKLAND, OF BRISTOL, VIRGINIA.

SAW-SET.

1,265,277.  Specification of Letters Patent.  Patented May 7, 1918.

Application filed June 21, 1917.  Serial No. 176,191.

*To all whom it may concern:*

Be it known that I, WILLIAM H. STRICKLAND, a citizen of the United States, residing at Bristol, in the county of Washington and State of Virginia, have invented certain new and useful Improvements in Saw-Sets, of which the following is a specification.

This invention relates to new and useful improvements in saw sets and the principal object of the invention is to provide means whereby the operator may see the saw tooth he is to set.

Another object of the invention is to make the holding jaws immovable with screw means for adjusting the space between them to suit different thicknesses of saws.

A further object of the invention is to provide a part bearing the immovable jaws with a slot to receive the working or lower jaw and with an opening extending through the top thereof and exposing the working space of the device.

Another object of the invention is to provide a device of this character, which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings, wherein like characters denote like or corresponding parts throughout the several views, and in which.

Figure 1:
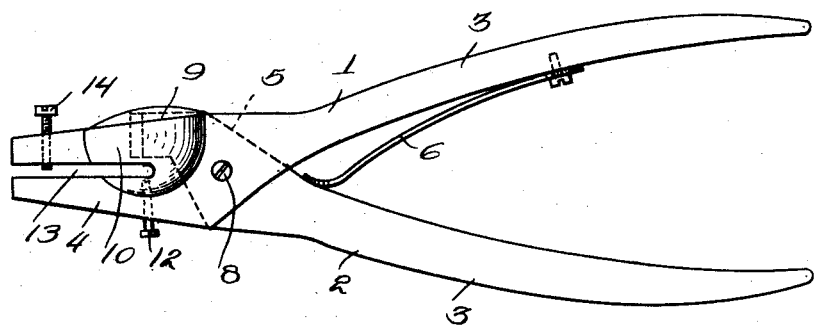
Figure 1 is an elevation of the invention.
Figure 2:
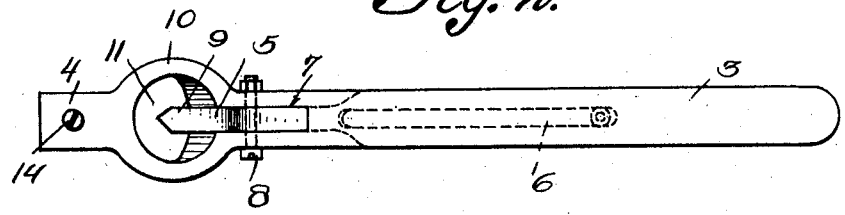
Fig. 2 is a plan view thereof.

In these figures 1 indicates one member of the device while 2 indicates the other member. Each of these members consists of the handle parts 3 and the jaw parts 4 and 5. A spring 6 secured to the part 1 and bearing against the part 2 normally holds the handle parts separated and with the jaws in inoperated position. The member 1 is provided with a slot 7 through which the jaw 5 of the member 2 passes and is pivoted therein by means of the pin 8. This jaw 5 projects upwardly at an angle from the part 2 and this inclined part passes through the slot 7. The extreme end of this part is bent and reduced in size as indicated at 9 to form the operative part of the jaw. The jaw 4 extends considerably beyond the jaw 5 and on its upper face is provided with an enlargement 10 which has a bowl shaped opening 11 therein into which the jaw 5 projects. A screw 12 carried by the under part of the jaw 4 projects up from the bottom of this opening on which the saw tooth is to rest after it has been bent by the jaw 5. The jaw 4 is provided with a slot 13, the inner end of which communicates with the opening 11 so as to permit the saw to be placed under the jaw 5. A screw 14 is carried by the upper part of the jaw 4 and has its lower end projecting into the slot 13 to hold the saw therein.

It will be understood that the slot 13 is to engage with the saw to be set, the screw 14 being turned to make a snug fit of the saw in said slot. The tool is moved on the saw until a tooth thereof comes under the jaw 5, this operation being easily carried out by reason of the fact that the operator can see the saw teeth through the opening 11. The tooth is bent by bringing the handles together so as to force the jaw 5 against the tooth and the amount of this bending action is regulated by means of the screw 12.

It is thought from the foregoing that the advantages and novel features of my invention will be readily apparent.

I desire it to be understood that I may make slight changes in the construction and in the combination and arrangement of the several parts, provided that such changes fall within the scope of the appended claim.

I claim as my invention:

A saw set comprising two members, each member consisting of a handle part and a jaw part, one member having an enlargement on its jaw part with a bowl shape pocket in said enlargement and being further provided with a slot leading from the end of the jaw into the pocket above the bottom thereof and with a passage communicating with the rear portion of the pocket, an abutment screw extending diagonally through the jaw into the lower portion of the pocket beneath the slot, and the other member having its jaw part extending through the passage into said pocket and pivotally mounted in the passage.

In testimony whereof I affix my signature in presence of two witnesses.

WILLIAM H. STRICKLAND.

Witnesses:
 JAMES L. DAVIS,
 S. V. FULKERSON.

Copies of this patent may be obtained for five cents each, by addressing the "Commissioner of Patents, Washington, D. C."